United States Patent [19]
An

[11] Patent Number: 5,335,122
[45] Date of Patent: Aug. 2, 1994

[54] AUTOMATIC TRACK LOCKING STATE CHECK CIRCUIT

[75] Inventor: Hong-jo An, Kwangmyung, Rep. of Korea

[73] Assignee: SamSung Electronics Co., Ltd., Suwon, Rep. of Korea

[21] Appl. No.: 701,826

[22] Filed: May 17, 1991

[30] Foreign Application Priority Data

May 21, 1990 [KR] Rep. of Korea .................. 90-7300

[51] Int. Cl.$^5$ .................................................. G11B 21/04
[52] U.S. Cl. .................................. 360/70; 360/73.01; 360/73.08; 360/77.15
[58] Field of Search .................. 360/70, 73.01, 73.06, 360/73.05, 73.07, 73.08, 77.13, 77.14, 77.15, 77.16, 78.02, 78.01, 60, 61, 62, 63, 64, 51, 73.09

[56] References Cited

U.S. PATENT DOCUMENTS

| | | | |
|---|---|---|---|
| 4,594,621 | 6/1986 | Noguchi et al. | 360/77.14 |
| 4,780,774 | 10/1988 | Edakubo et al. | 360/77.15 |
| 4,791,507 | 12/1988 | Doyama et al. | 360/73.08 |
| 4,899,233 | 2/1990 | Yoshida | 360/77.13 |
| 4,985,786 | 1/1991 | Arai et al. | 360/73.05 |
| 5,026,509 | 6/1991 | Arai et al. | 360/77.14 |

Primary Examiner—Aristotelis Psitos
Assistant Examiner—Muhammad Edun
Attorney, Agent, or Firm—Robert E. Bushnell

[57] ABSTRACT

In a rotary digital audio tape recorder, an automatic track finding locking state check circuit comprises a variable speed playback mode selector for logically combining the control data for the forward direction or the reverse direction and each n-fold multiple speed and for selecting the playback mode, a counter for counting sample-hold pulses for a predetermined time, a decoder for decoding the result of the sample-hold pulse count according to the result of variable speed playback mode selection, a latch portion for being synchronized to the predeterminedly delayed switching head pulse to latch the decoding result, thereby generating the automatic track finding locking signal, and a locking check clock generator for setting the locking range according to the switching head pulse and the system reset or the microcomputer reset signal state, and controlling the generation of the automatic track finding locking signal of the latch portion and the initiation of the counter. Since the ATF determines whether or not the locking of the tracking servo occurs, the stability of the system is raised.

20 Claims, 7 Drawing Sheets

| SPEED | FORWARD AREA | | | | REVERSE AREA | | | |
|---|---|---|---|---|---|---|---|---|
| | | A1 | A2 | | | A1 | — | |
| | | B1 | B2 | | | B1 | — | |
| X1 | | A1 | A2 | | | A1 | — | |
| | | B1 | B2 | | | B1 | — | |
| X2 | | — | A2 | | | A1 | A2 | |
| | | (B1) | — | | | B1 | — | |
| X3 | | A1 | — | | | A1 | — | |
| | | B1 | — | | | B1 | — | |
| X5 | | A1 | — | | | A1 | — | |
| | | B1 | — | | | B1 | — | |
| X9 | | A1 | — | | | A1 | — | |
| | | B1 | — | | | B1 | — | |
| X16 | | — | A2 | | | — | A2 | |
| | | (B1) | — | | | (B1) | — | |

(5b)

| SPEED | FORWARD AREA | | | | REVERSE AREA | | | |
|---|---|---|---|---|---|---|---|---|
| X1 | | — | A2 | | | — | A2 | |
| | | — | B2 | | | — | B2 | |
| X2 | | A1 | (B2) | | | A1 | (B2) | |
| | | — | A2 | | | — | A2 | |
| X3 | | — | B2 | | | — | B2 | |
| | | — | A2 | | | — | A2 | |
| X5 | | — | B2 | | | — | B2 | |
| | | — | A2 | | | — | A2 | |
| X9 | | — | B2 | | | — | B2 | |
| | | A1 | — | | | A1 | — | |
| X16 | | — | (B2) | | | — | (B2) | |

A1 : A TRACK ATF1   B1 : B TRACK ATF1
A2 : A TRACK ATF2   B2 : B TRACK ATF2

FIG. 6

AUTOMATIC TRACK LOCKING STATE CHECK CIRCUIT

BACKGROUND OF THE INVENTION

The present invention relates to an automatic track finding (hereinafter, referred to as an ATF) circuit having the tracking servo functions in a rotary digital audio tape recorder (hereinafter, referred to as an R-DAT) and more particularly, to an ATF locking circuit which improves the stability of the whole servo system by checking the ATF locking state to cause tracking servo action.

Figure 1:
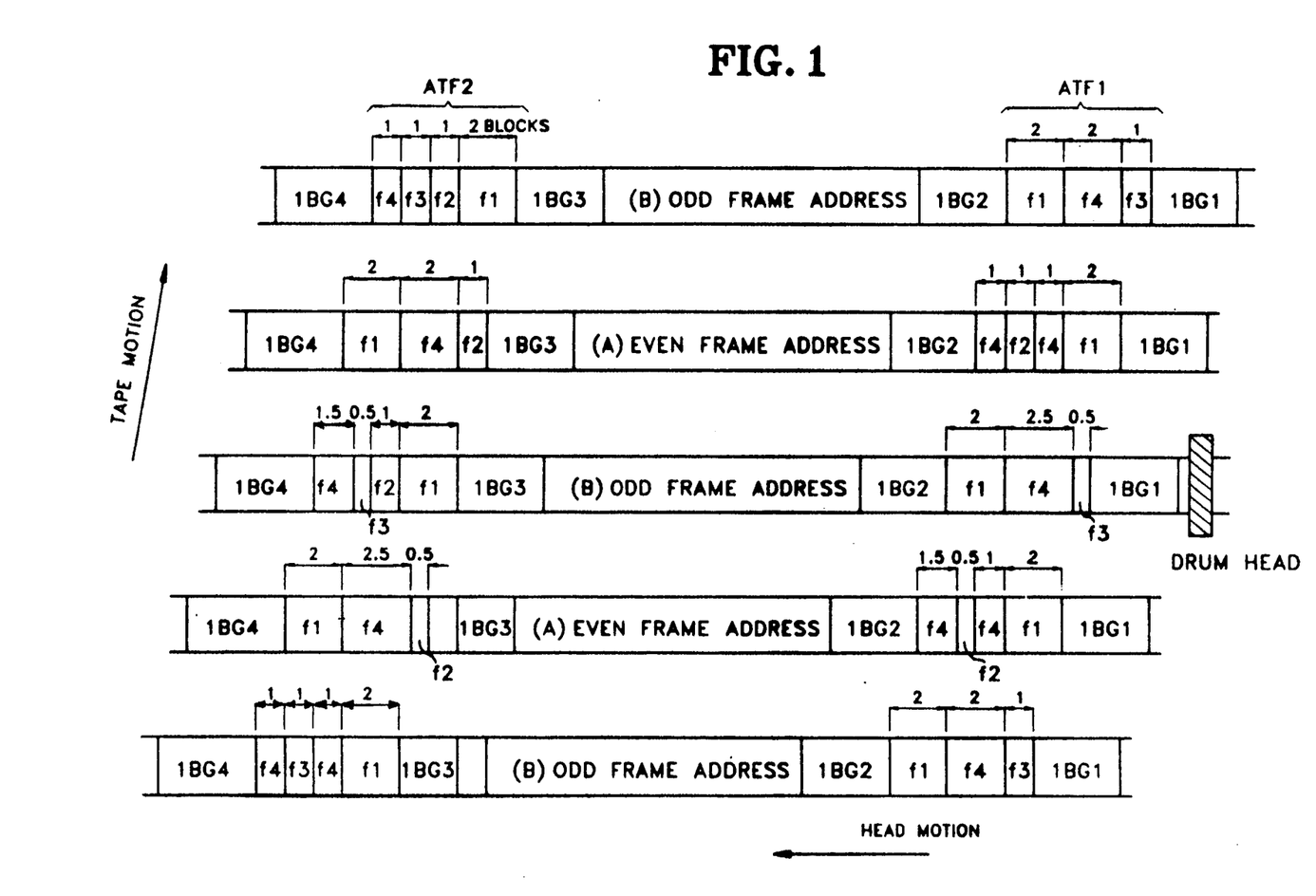
FIG. 1 shows the standard format of the rotary digital audio tape.
Figure 2:
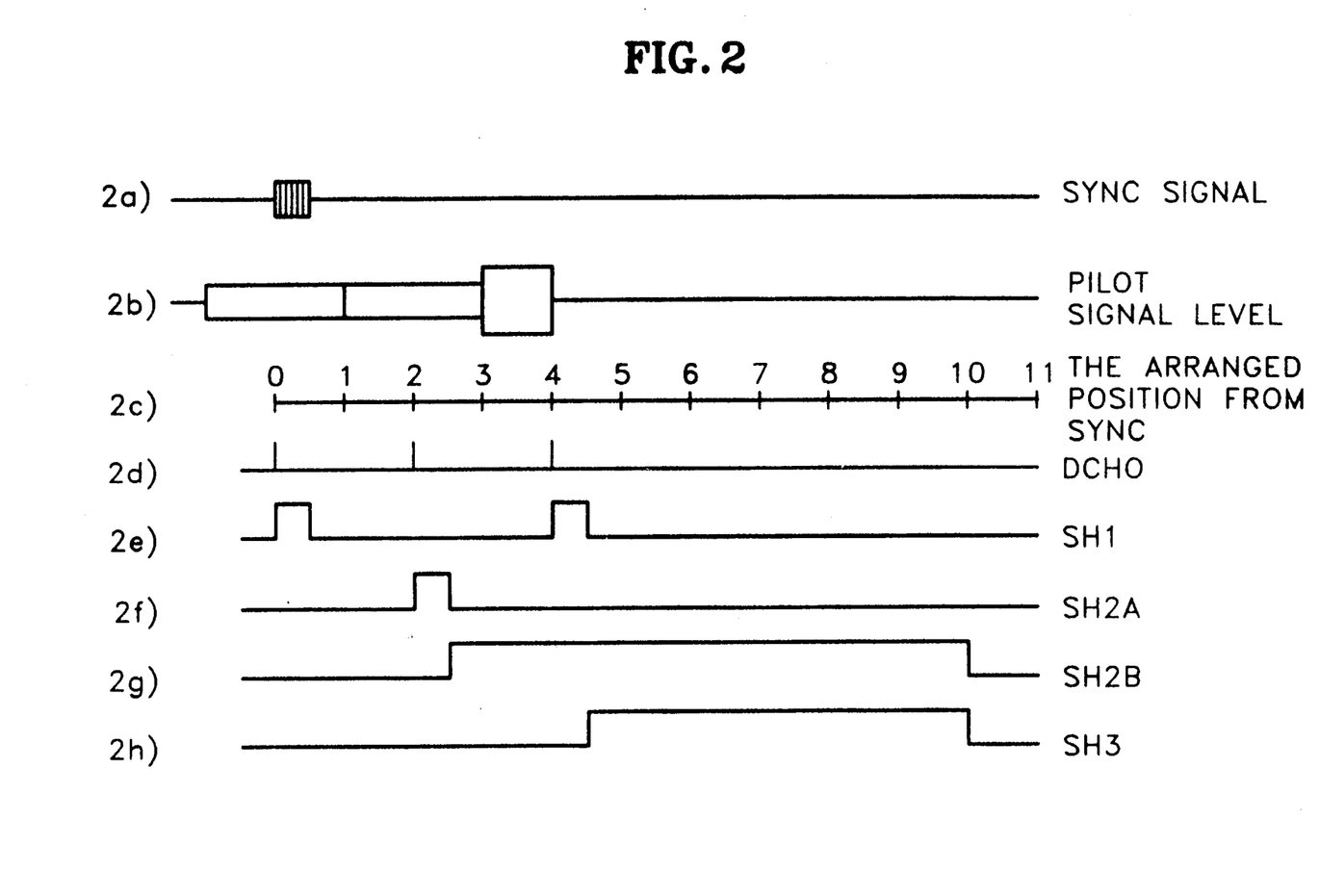
FIG. 2 shows a variety of sampling pulses for the standard format digital audio tape.

Generally, the ATF circuit having functions for automatically performing the tracking during the playback uses the ATF signal that is included among the radio frequency (hereinafter, referred to as "RF") signals. The standard format of the R-DAT tape is shown in FIG. 1. The digital audio tape recorder using the digital audio tape having the standard format shown in FIG. 1 as a recording medium generates a variety of pulses shown in FIG.2, to automatically carry out the ATF. The ATF block in the digital audio tape recorder detects an ATF synchronizing signal such as FIG. 2a from the reproduced RF signal, and produces sampling pulses such as FIGS. 2e to 2h of for generating the ATF voltage to detect the pilot signal level such as FIG. 2b on the ATF track pattern of the before-and-after tracks. The ATF block samples and holds (hereinafter, referred to as SH) the pilot signal amplified and detected by the sampling pulse to produce the ATF error voltage and controls the position of the head on the track in response to the ATF error voltage. Also, FIG. 2d is a discharge pulse. That is, the tracking error (TE) signal is generated by the pilot signal level of the track, itself, where the head passes, and the pilot signal level of the adjacent track. Thus, if the head is not positioned at the center of the track and leans to one direction, a difference from the pilot signal level of the adjacent track is generated. The ATF block detects the difference and supplies the difference to the capstan motor, thereby controlling the head to trace the center of the track. Since the actual head is one and half times as large as the track width, crosstalk of the data recorded on the adjacent track is possible.

Errors can be generated during tracking, and if there is an index which can show whether the tracking is carried out correctly or not, the problems caused by the generation of errors can be easily solved because the current tracking state can be known and the control that can return to the tracking to a normal state is made possible.

SUMMARY OF THE INVENTION

It is an object of the present invention to provide an ATF locking circuit for a R-DAT which can improve the stability of the whole servo system by carrying out the tracking servo function while checking the ATF locking state.

To achieve the object, the present invention comprises:

a variable speed playback mode selector for logically combining the control data relating to forward direction or the reverse direction and each n-fold multiple speed, to select the playback mode;

a counter for counting the sample-hold pulses for a predetermined time;

a decoder for decoding the result of the sample-hold pulse count according to the selected variable speed playback mode;

a latch portion for latching the decoded result by synchronizing to the switching head pulse which is predeterminedly frequency-divided, and generating an automatic track finding locking signal; and a locking check clock generator for setting the locking range according to the switching head pulse and the system reset or microcomputer reset signal state and controlling the generation of the automatic track finding locking signal of the latch portion and the initialization of the counter.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Hereinafter, the present invention will be described with reference to the accompanying drawings.

Figure 3:
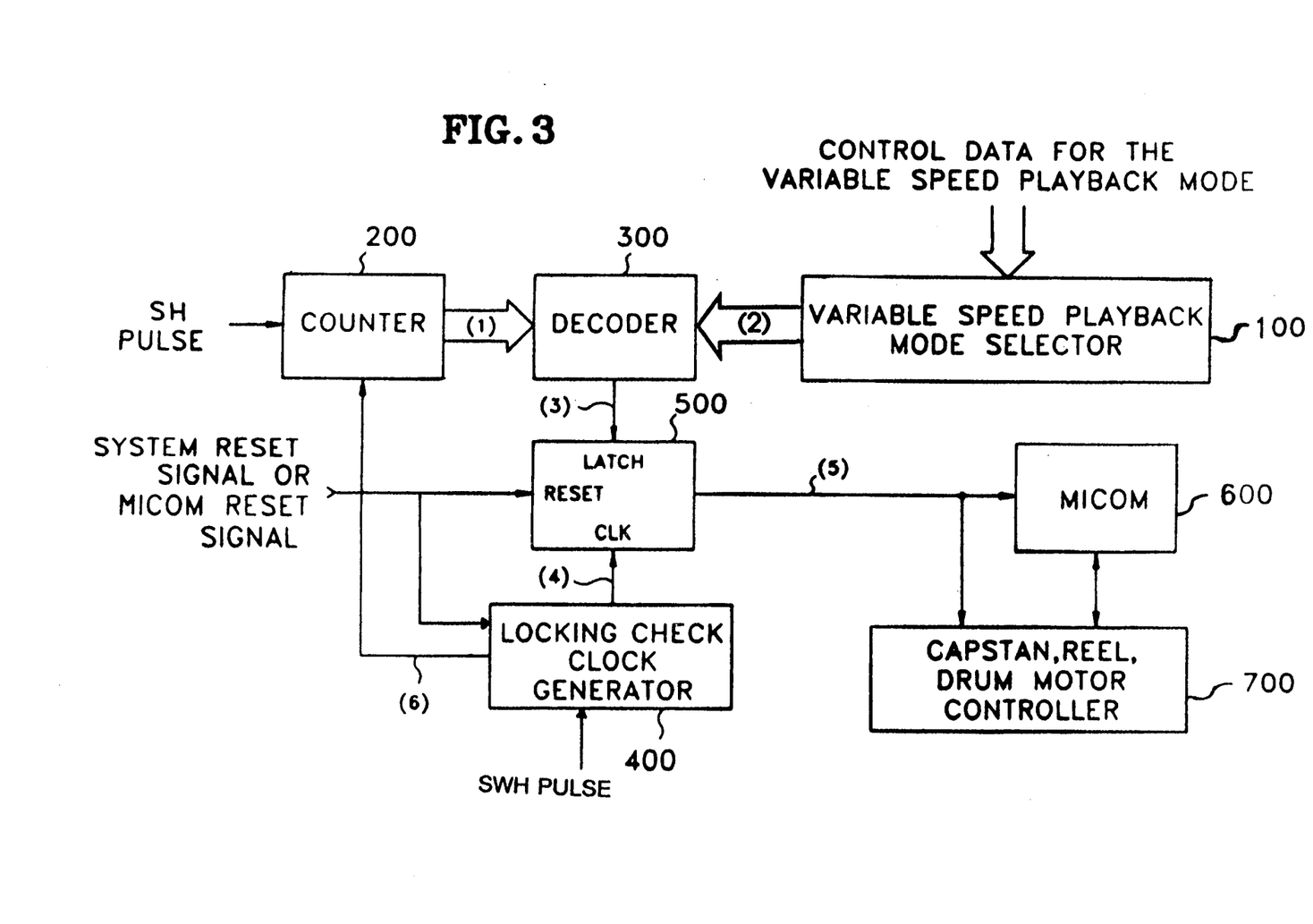
FIG. 3 an embodiment of an automatic track locking state check circuit according to the present invention.

FIG. 3 is a view showing an embodiment of the automatic track locking state check circuit according to the present invention. FIG. 3 shows the variable speed playback mode selector 100 for logically combining the control data for the forward direction or the reverse direction and each n-fold multiple speed input from the microcomputer and selecting the playback mode; a counter 200 for counting the sample-hold pulses during a predetermined time; a decoder 300 for decoding the result of the sample-hold pulse count according to the result of the variable speed playback mode selection; a latch portion 500 in synchronism to the predeterminedly frequency-divided switching head pulse SWH for latching the decoding result to generate the automatic track finding locking signal; and a locking check clock generator 400 for setting the locking range according to the switching head pulse SWH and the system reset or microcomputer reset signal state, and for controlling the generation of the automatic track finding locking signal of the latch portion 500 and the initiation of the counter 200.

Figure 4:
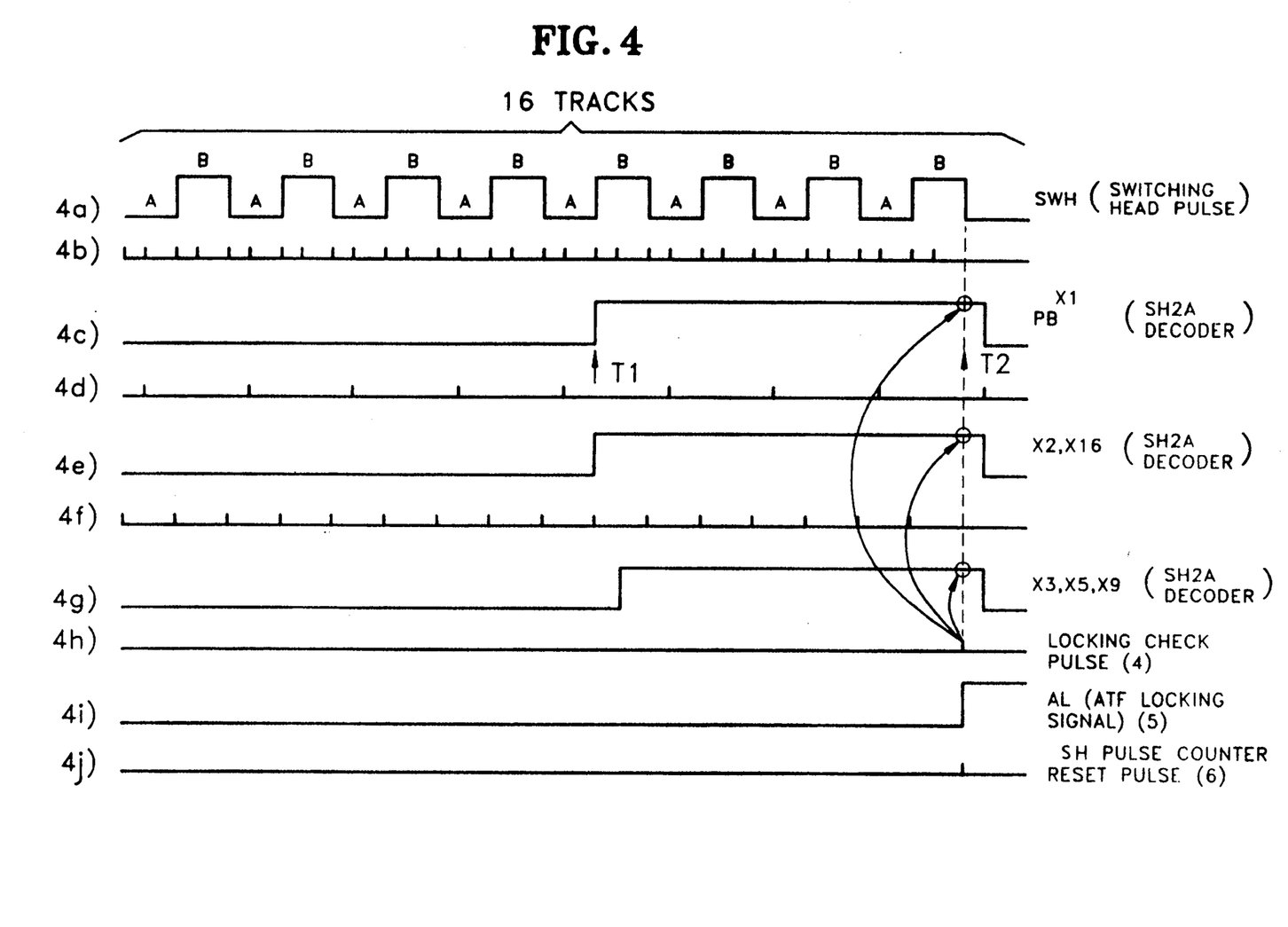
FIG. 4 is a timing diagram showing each part of the circuit shown in FIG. 3.

FIG. 4 is a timing diagram showing the operations at several portions of the circuit shown in FIG. 3. In FIG. 4, 4a is a waveform of the switching head pulse, 4b is a waveform of a SH2A pulse generated at 1-fold multiple speed playback, 4c is an output waveform of the decoder 300 at 1-fold multiple speed, 4d is a waveform of a SH2A pulse generated at the 2-fold and 16-fold multiple speed playbacks, 4e is an output waveform of the decoder 300 at the 2-fold and 16-fold multiple speeds, 4f is a waveform of a SH2A pulse generated at the 3-fold, 5-fold, 9-fold multiple speeds, 4g is an output waveform of the decoder 300 at the 3-fold, 5-fold, 9-fold multiple speeds, 4h is a waveform of locking check pulse, 4i is a waveform of automatic track finding locking signal, and 4j is a waveform of sample-hold counter reset pulse.

Figure 6:
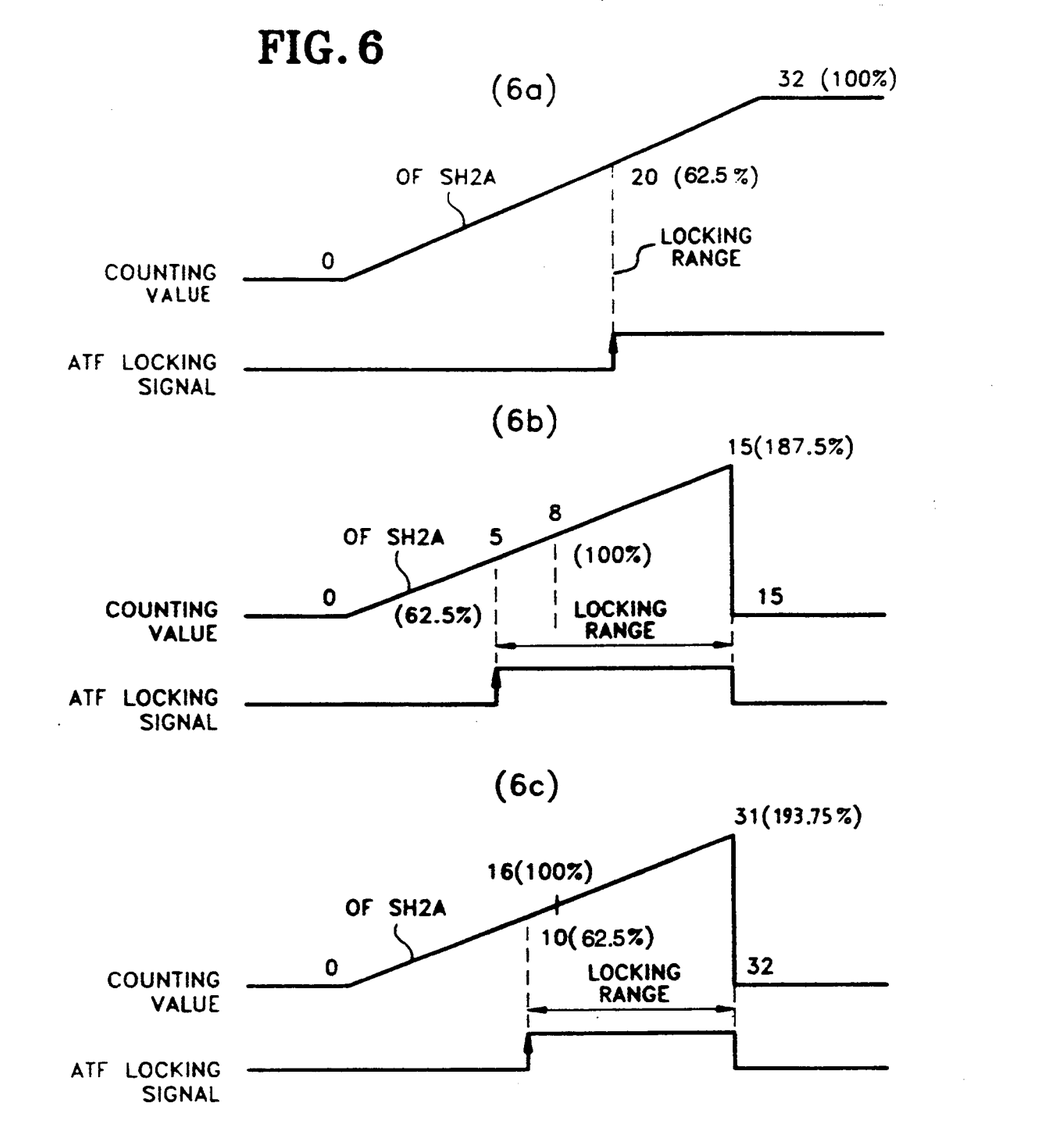
FIG. 6 is a view showing the relationship between the automatic track finding locking range and the locking signal generation, according to the present invention.

FIG. 6 shows the relationship between the automatic track finding locking range and the locking signal generation according to the present invention. In FIG. 6, 6a is in the 1-fold multiple speed playback, 6b is in the 2-fold and 16-fold multiple speed playbacks, and 6c is in the 3-fold, 5-fold, and 9-fold multiplied speed playbacks.

Figure 7:
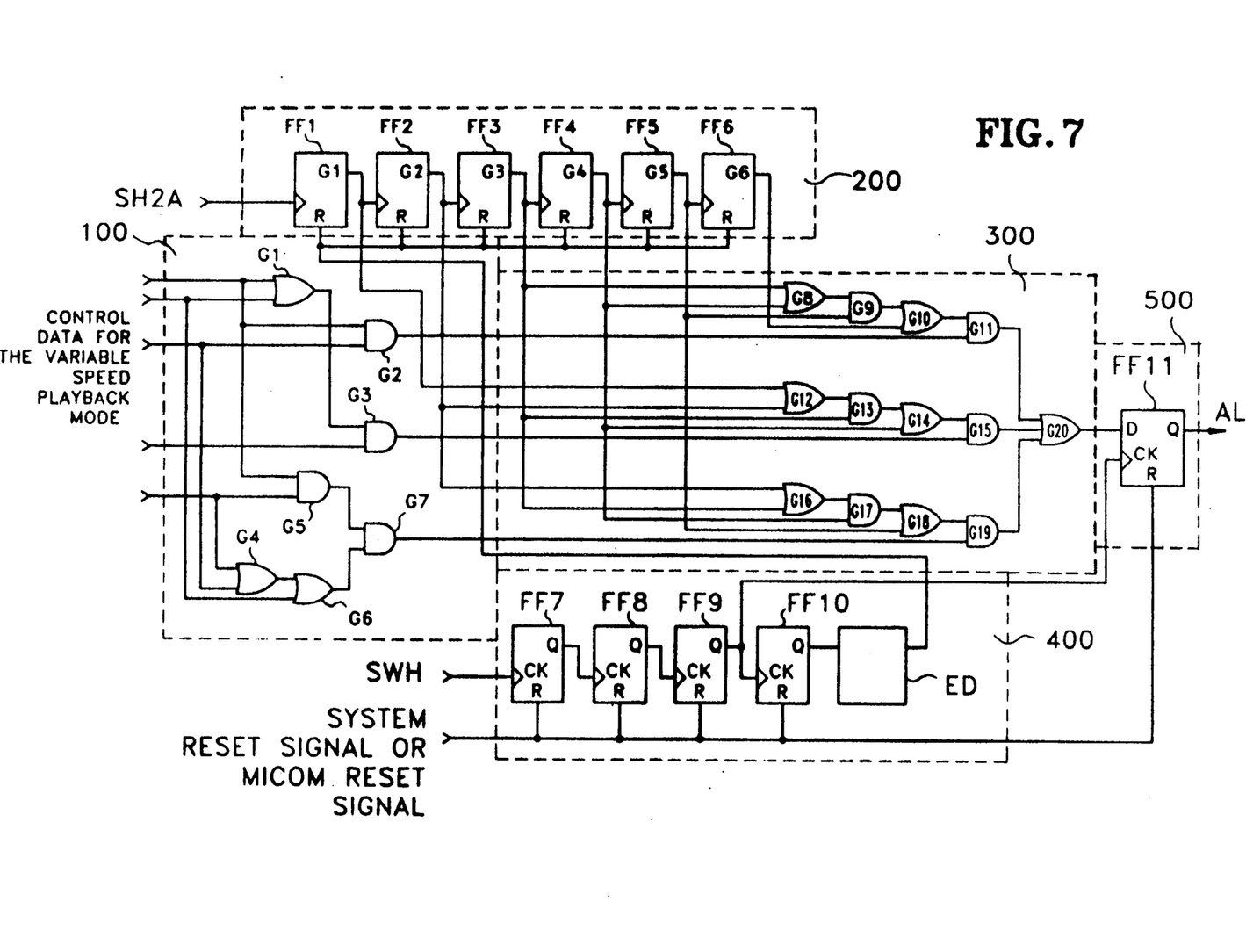
FIG. 7 is a circuit diagram of the circuit shown in FIG. 3.

FIG. 7 is a circuit diagram of the circuit according to the present invention. In FIG. 7, the variable speed playback mode selector 100 consists of three OR gates G1, G4, and G6 and four AND gates G2, G3, G5, and G7, the sample-hold pulse counter 200 consists of the first through sixth flip-flops FF1 to FF6, the decoder 300 consists of seven OR gates G8, G10, G12, G14, G16, G18, and G20, and six AND gates G9, G11, G13, G15, G17, and G19, the locking check clock generator 400 consists of the seventh to the tenth flip-flops FF7 to FF10 and the edge detector ED, and the latch portion 500 consists of the eleventh flip-flop FF11.

The present invention will be described in more detail based on the aforementioned constitution.

The basic principle of the present invention is to use the SH pulse generated during playback. In detail, the SH pulse is generated according to the way how tracking takes place in the track being scanned and when the SH pulse is generated, it is used as an index for determining correct detection of the synchronizing signal because the whole feedback loop is formed to carry out the tracking servo function. And, in the present invention, among the sampling pulses in FIG. 2, the use of the SH2A signal will be described as an example. When the head scans the ATF region and detects the synchronizing signal, one SH2A pulse is generated and the SH pulse counter 200 counts the SH2A pulse. At this time, the decoder 300 decodes the output 1 of the counter 200 according to the respective 1-fold, 2-fold, 3-fold, 5-fold, 9-fold, and 16-fold multiple speeds of the variable speed playback modes and if the current n-fold multiple speed mode is selected by the variable speed playback mode selector 100, the decoded output corresponding to the selected multiple speed is outputted. The variable speed playback mode selector 100 receives the variable speed playback mode control data from the microcomputer (not shown) and selects the output of the decoder 300 according to the variable speed playback mode. The locking check clock generator 400 generates a reset signal to reset the counter 200 at the proper timing by latching the output of the decoder 300 selected according to the variable speed playback mode at a constant timing. Here, the locking check time and the counter reset time are determined by how the specification in the system is determined or what the stability of the system will be. The detailed operation of the present invention will be described in the case when the SH2A signal is used as the clock of the counter 200 and the locking signal finding interval consists of 16 tracks. At the 1-fold multiple speed playback, since each track produces two SH2A pulses, the first to the sixteenth tracks generate 32 SH2A pulses as shown in 4b of FIG. 4.

Figure 5:
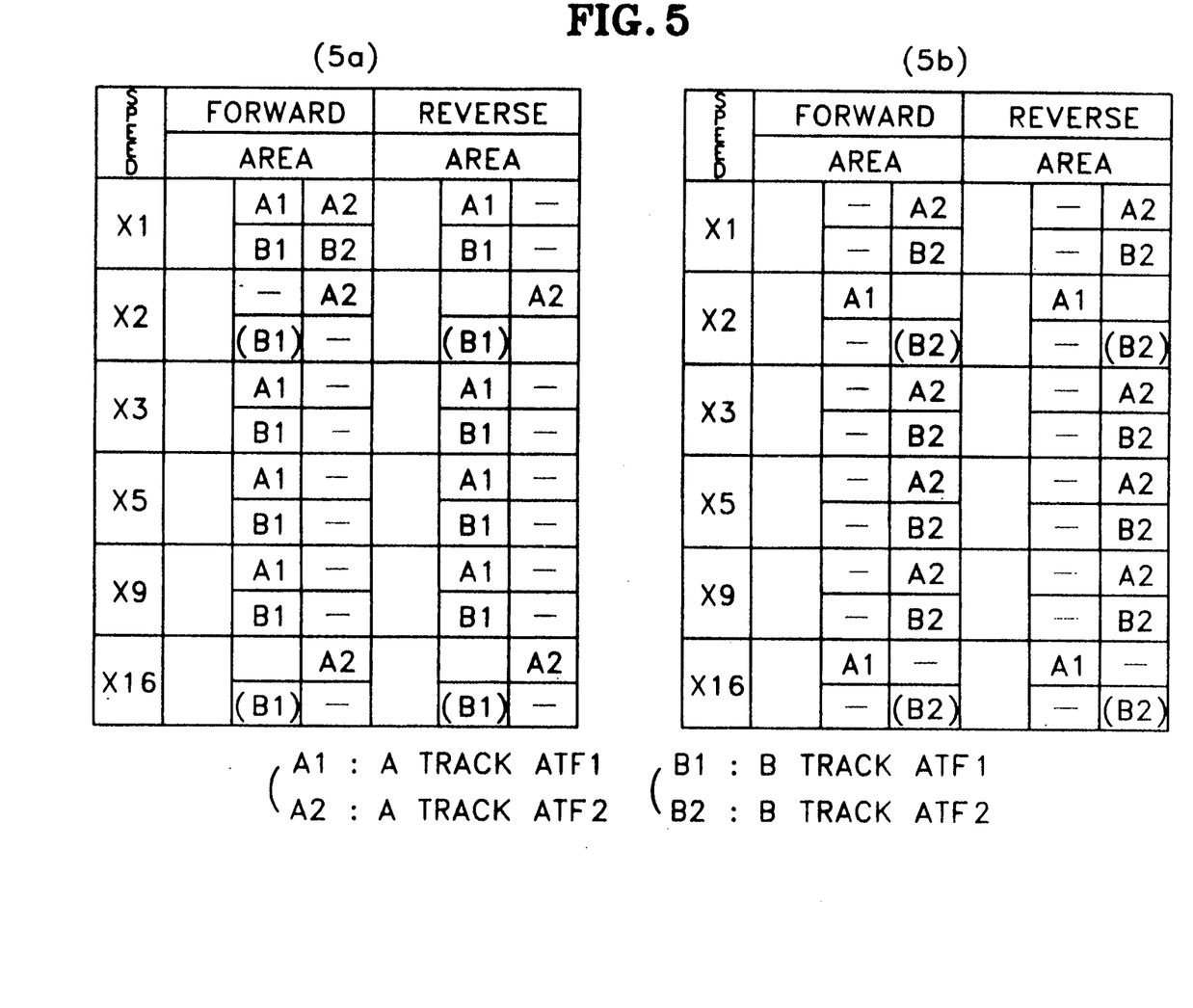
FIG. 5 is tables showing the automatic track finding state.

Referring to FIG. 5, the tables of 5a and 5b show a method for scanning the ATF pattern of the tape track by the head. Here, since there are differences according to the respective multiple speed codes, generation of SH2A pulses is determined by how the head scans the ATF pattern of each case. That is, the SH2A pulse is generated only in the ATF region scanned by the head. Here, the case shown in the table 5a will be described. In table 5a, during a 1-fold multiple speed playback, since two SH2A pulses are produced in each track, 32 pulses are generated from the first track to the sixteenth tracks. At the 2-fold and 16-fold multiple speeds, since the SH2A pulse is generated only in the region A2, all 8 pulses are generated from 16 tracks. At the 3-fold, 5-fold, 9-fold multiple speeds, since an SH2A pulse is generated only in the regions of A1 and B1, 16 SH2A pulses are generated from 16 tracks.

FIG. 4 shows the operations of respective blocks when the detection of the synchronizing signal is optimally performed at each multiple speed mode. But, in fact, the operation as in FIG. 4 can not be carried out at the time of starting the automatic tracking. Thus, it should be considered that the detection of the synchronizing signals abnormally performed. To prepare for the detection of the abnormal synchronizing signal at each multiple speed mode, the decoder 300 has the following locking ranges. Since the SH pulses are generated with reference to the synchronizing signal of the scanned track, two SH2A pulses per track are generated at the 1-fold multiple speed. There is an interval when the operation is wholly normal in tracking, but the synchronizing signal can not be detected by trivial error, so it is preferred that the locking range be set within some error limit, rather than determining the locking of the ATF only when the exact 32 SH2A pulses are generated for 16 tracks at the 1-fold multiple speed playback mode. (This is the same in the variable speed mode)

In the 1-fold multiple speed playback mode, the output 3 of the decoder 300 is stabilized when the existent count value is in the range of 20 as a minimum to 32 as a maximum value. That is, if the head scans all of the ATF regions to keep an optimum tracking state, 32 SH2A pulses per 16 tracks are produced, and if more than 20 SH2A pulses are produced, the locking is accomplished. At this time, the lower limit of the locking region is 62.5% and below the lower limit, the locking does not occur by the n-fold multiple speed. The upper limit of the detection of the SH2A pulse at 1-fold multiple speed is 100% with 32 pulses, because the SH2A pulses over 32 are not generated in 16 tracks.

At 2-fold and 10-fold multiple speeds, since the SH2A pulse is generated only in the ATF7 (A2) region of the track A, 8 SH2A pulses per 16 tracks are generated, where the lower limit is 5 (62.5%) and the 8 modes generation is 100%. Also, in contrary to the 1-fold multiple speed, SH2A pulses over 8 can be detected, and accordingly the upper limit is set at 187.7% with 16.

At 3-fold, 5-fold, and 9-fold multiple speeds, since the SH2A pulses are generated only in the ATF1 (A1) of the track A and the ATF2 (B2) region of track B, 16 SH2A pulses for 16 tracks are generated and set as 100%. Also, at the 3-fold, 5-fold, and 9-fold multiple speeds, since the SH2A pulses over 16 can be generated, the upper limit is 31 (193.75%) and the lower limit is 10 (62.5%). The relationship between the locking range determined through the aforementioned process and the ATF locking signal generation according to the locking range is shown in FIG. 6.

The output of the decoder 300 according to each n-fold multiple speed mode is latched in the falling edge of the sixteenth track by the locking check clock generator 400 as shown in FIG. 4. Here, the AL signal 5 is in a high state to show that the ATF system is locked. The latch portion 500 determines the stability of the system by the system reset or the microcomputer reset, to be reset, if necessary. Also, the counter 200 is reset by the output 6 of the locking check clock generator 400 before the first ATF region of the seventeenth track after the sixteenth track. The ATF locking signal generated through the aforementioned process is connected to the capstan or the reel locking signals and is interfaced with the microcomputer or is directly connected to the microcomputer to determine the stability of the system. The digital PLL is used as a control means to generate PWM, thereby carrying out the motor control operation to raise the stability of the whole servo system.

The variable speed playback mode selector 100 outputs a decoded value according to each n-fold multiple speed mode, at 2-fold, 3-fold, 6-fold, 9-fold, and 16-fold multiple speeds. Since the forward and reverse directions use the same ATF region, both the forward direction and the reverse direction become "1" commonly at each 2-fold, 3-fold, 5-fold, 9-fold, and 16-fold multiple speeds. In 1-fold multiplied speed, all of ATF regions are used in the forward direction, and the case of the reverse direction is the same as the 3-fold, 5-fold, and 9-fold multiple speed modes. The decoding portion 300 is shown in FIG. 7.

For instance, in the case of the forward direction 1-fold multiple speed is explained. According to the aforementioned assumption, only the outputs of the OR gate G1 and the AND gate G2 of the variable speed playback mode selector 100 are at a high state and the outputs of the other gates G3 to G7 are at a low state. Thus, an input terminal of the AND gate G11 of the decoding portion 300 which inputs the output of the AND gate G2 is at a high state. Also, the SH pulse counter 200 consisting of the first to the sixth T flip-flops FF1 to FF6 counts the SH2A pulses such as 4a of FIG. 4 and when the outputs of the third and fifth flip-flops FF3 and FF4 come to a high state, i.e. when the count value becomes "20", the output of the AND gate G8 is at a high state and the AND gate G9 for AND-gating the outputs of the AND gate G8 and the fifth flip-flop FF5 also outputs a high state, As a result, the output of the OR gate G10 which receives the output of the AND gate G9 goes to a high state, so that the output of the AND gate G11 too becomes a high state. Thus, the output of the OR gate G20 is at a high state. That is, the decoding portion 300 keeps the ATF locking signal in a high state from T1 to T2 as shown in 4c. Here, as shown in 4h, the ATF locking signal is latched in the latch portion 500 when the locking check pulse is generated from the locking check clock generator 400 and the ATF locking signal is outputted at a high state as shown in 4i. At the same time, the SH pulse counter reset pulse S1 as in 4j is produced from the edge detector ED of the locking check clock generator 400, to reset the counter 200, Similarly, at other n-fold multiple speeds, i.e., 2-fold, and 16-fold multiple speeds, the SH2A pulse is generated as in 4d and the output of the decoder 300 is 4e. Also, at 3-fold, 5-fold, and 9-fold multiple speeds, the SH2A pulse is generated as in 4f and the output of the decoder 300 is 4g.

As described above, according to the present invention, since the ATF determines whether or not locking of the tracking servo takes place, not only can the stability of the system be improved but better operational control is made possible when the microcomputer or the motor controller connected.

What is claimed is:

1. An automatic track checking circuit of a rotary digital audio tape recorder, comprising:
    variable speed selector means for logically combining control data for one of a forward direction and a reverse direction, and providing a selected speed among a plurality of speeds for a playback mode from said control data;
    counter means for counting sampled-and-hold pulses for a predetermined time to provide counted signals;
    decoder means for decoding said counted signals according to said selected speed to provide a decoded signal;
    latch means in synchronism with switching head pulses, for latching said decoded signal to generate an automatic track locking signal; and
    locking check clock generator means for setting a locking range for a tracking servo according to said switching head pulses and a system reset signal, and controlling the generation of said automatic track locking signal of said latch means and the initiation of said counter means.

2. The automatic track checking circuit as claimed in claim 1, wherein said variable speed selector means comprises:
    a first OR gate for logically combining first and second control data representative of first and second speed playback modes to provide a first OR gated signal;
    a second OR gate for logically combining third and fourth control data representative of third and fourth speed playback modes to provide a second OR gated signal;
    a third OR gate for logically combining said second control data and said second OR gated signal to provide a third OR gated signal;
    a first NAND gate for logically combining said first and third control data to provide a first speed selected signal representative by one of an "ON" state and an "OFF" state;
    a second NAND gate for logically combining a fifth control data representative of a fifth speed playback mode and said first OR gated signal to provide a second speed selected signal representative by one of an "ON" state and an "OFF" state;
    a third NAND gate for logically combining said first and fourth control data to provide a NAND gated signal; and
    a fourth NAND gate for logically combining said third OR gated signal and said NAND gated signal to provide a third speed selected signal representative by one of an "ON" state and an "OFF" state.

3. The automatic track checking circuit as claimed in claim 2, wherein said counter means comprises a plurality of successive flip-flops coupled to receive said sampled/hold pulses for counting a number of sampled/hold pulses in a number of tracks in dependence upon reception of a counter reset signal generated from said locking clock generator means.

4. The automatic track checking circuit as claimed in claim 3, wherein said locking clock generator means comprises a plurality of successive flip-flops coupled to receive said switching head pulses and said system reset signal, for providing said counter reset signal to enable initialization of said counter means and a latching clock signal to drive said latch means.

5. The automatic track checking circuit as claimed in claim 4, wherein said decoder means comprises a plurality of logic gates coupled to receive said first, second, and third speed selected signals and each counted signal generated from each flip-flop from said counter means, for decoding said counted signals in dependence upon logic states of said first, second and third speed selected signals to provide said decoded signal.

6. The automatic track checking circuit as claimed in claim 5, wherein said latch means is a flip-flop for latching said decoded signal in dependence upon said latching clock signal and said system reset signal to provide said automatic track locking signal.

7. A method for automatic track locking of a rotary digital audio tape recorder, comprising the steps of:
  logically combining control data for one of a forward direction and a reverse direction, to provide a selected speed from a plurality of speeds for a playback mode;
  counting a number of sampled-and-hold pulses for a predetermined time period to provide counted signals in dependence upon a counter reset signal;
  decoding said counted signals according to said selected speed to provide a decoded signal;
  latching said decoded signal in synchronism with switching head pulses to generate an automatic track locking signal; and
  setting a locking range according to said switching head pulses and a system reset signal to control the generation of said automatic track locking signal and said counter reset signal.

8. An automatic track checking circuit of a rotary digital audio tape recorder, comprising:
  means for receiving a plurality of sampled-and-hold pulses;
  means for counting a number of said sampled-and-hold pulses for a predetermined time period to provide counted signals in dependence upon reception of a counter reset signal;
  means for logically combining a plurality of control data indicative of a plurality of playback modes of different speeds to provide selected ones of a plurality of speed selected signals respectively representative by one of a logic "ON" state and a logic "OFF" state;
  means for decoding said plurality of counted signals in accordance with said logic states of said plurality of speed selected signals to provide a decoded signal;
  means for latching said decoded signal to provide an automatic track locking signal in synchronism with a plurality of switching head pulses; and
  means for setting a locking range of a tracking servo in accordance with said plurality of switching head pulses and a system reset signal to control generation of said automatic track locking signal and said counter reset signal.

9. The automatic track checking circuit as claimed in claim 8, wherein said logically combining means comprises:
  a first OR gate for logically combining first and second control data representative of first and second speed playback modes to provide a first OR gated signal;
  a second OR gate for logically combining third and fourth control data representative of third and fourth speed playback modes to provide a second OR gated signal;
  a third OR gate for logically combining said second control data and said second OR gated signal to provide a third OR gated signal;
  a first NAND gate for logically combining said first and third control data to provide a first speed selected signal representative of one of said logic "ON" state and said logic "OFF" state;
  a second NAND gate for logically combining fifth control data representative of a fifth speed playback mode and said first OR gated signal to provide a second speed selected signal representative of one of said logic "ON" state and said logic "OFF" state;
  a third NAND gate for logically combining said first and fourth control data to provide a NAND gated signal; and
  a fourth NAND gate for logically combining said third OR gated signal and said NAND gated signal to provide a third speed selected signal representative by one of said logic "ON" state and said logic "OFF" state.

10. The automatic track checking circuit as claimed in claim 9, wherein said counting means comprises a plurality of successive flip-flops coupled to receive said plurality of sampled-and-hold pulses, for counting a number of said sampled-and-hold pulses in a number of tracks in dependence upon reception of said counter reset signal.

11. The automatic track checking circuit as claimed in claim 10, wherein said setting means comprises a plurality of successive flip-flops coupled to receive said plurality of switching head pulses and said system reset signal, for providing said counter reset signal to enable initialization of said counting means and a latching clock signal to drive said latching means.

12. The automatic track checking circuit as claimed in claim 11, wherein said decoding means comprises a plurality of logic gates coupled to receive said first, second, and third speed selected signals and each counted signal of said plurality of counted signals generated from each flip-flop from said counting means, for decoding said counted signals in dependence upon logic states of said first, second and third speed selected signals to provide said decoded signal.

13. The automatic track checking circuit as claimed in claim 12, wherein said latching means is a flip-flop for latching said decoded signal in dependence upon said latching clock signal and said system reset signal to provide said automatic track locking signal.

14. The automatic track checking circuit as claimed in claim 8, wherein said logically combining means comprises:
  first gate mechanism for logically combining first and second control data representative of first and second speed playback modes to provide a first gated signal;
  second gate mechanism for logically combining third and fourth control data representative of third and fourth speed playback modes to provide a second gated signal;

third gate for logically combining said second control data and said second gated signal to provide a third gated signal;

fourth gate mechanism for logically combining said first and third control data to provide a first speed selected signal representative of one of said logic "ON" state and said logic "OFF" state;

fifth gate mechanism for logically combining fifth control data representative of a fifth speed playback mode and said first gated signal to provide a second speed selected signal representative of one of said logic "ON" state and said logic "OFF" state;

sixth gate mechanism for logically combining said first and fourth control data to provide a fourth gated signal; and fifth gate mechanism for logically combining said third gated signal and said fourth gated signal to provide a third speed selected signal representative of one of said logic "ON" state and said logic "OFF" state.

15. The automatic track checking circuit as claimed in circuit 14, wherein said counting means comprises a first plurality of successive bi-stable stages coupled to receive said plurality of sampled-and-hold pulses, and to make a count of said sampled-and-hold pulses in a number of tracks in dependence upon reception of said counter reset signal.

16. The automatic track checking circuit as claimed in claim 15, wherein said setting means comprises a second plurality of successive bi-stable stages coupled to receive said plurality of switching head pulses and said system reset signal, and to provide said counter reset signal to enable initialization of said counting means and a latching clock signal to drive said latching means.

17. The automatic track checking circuit as claimed in claim 16, wherein said decoding means comprises a plurality of logic gates coupled to receive said first, second, and third speed selected signals and each counted signal if said plurality of counted signals generated from successive bi-stable mechanisms of said counting means, and to decode said counted signals in dependence upon logic states of said first, second, and third speed selected signals to provide said decoded signal.

18. The automatic track checking circuit as claimed in claim 17, wherein said latching means comprises bi-stable means for providing successive automatic track locking signal by latching said decoded signal in dependence upon said latching clock signal and said system reset signal.

19. An automatic track checking circuit of a recorder, comprising:

means for selecting a playback mode from a plurality of playback modes of different speeds in one of a forward direction and a reverse direction;

means for counting a number of sampled-and-hold pulses for a predetermined time period to provide counted signals, the number of said sampled-and-hold pulses representing a number of tracks of a recording medium;

means for generating decoded signals by decoding said counted signals in dependence upon said playback mode and for generating an automatic track finding lock signal by latching the decoded signals in dependence upon switch head pulses; and means for setting a locking range of a tracking servo by controlling the generation of said automatic track finding lock signal and the counting of said sampled-and-hold pulses.

20. The automatic track checking circuit as claimed in claim 19, wherein:

said counting means comprises a first plurality of successive bi-stable stages coupled to receive said sampled-and-hold pulses, for enabling a count of said sampled-and-hold pulses representing a number of tracks in dependence upon reception of a counter reset signal;

said setting means comprises a second plurality of successive bi-stable stages coupled to receive said switching head pulses and a system reset signal, for providing said counter reset signal to enable initialization of said counting means and a latching clock signal to enable operation of said latching means;

said decoding means comprises a plurality of logic gates coupled to receive each playback mode and each counted signal if said counted signals generated from successive bi-stable mechanisms of said counting means, for decoding said counted signals in dependence upon said playmode to provide said decoded signals; and said latching means comprises bi-stable means for providing successive automatic track finding lock signal by latching said decoded signals in dependence upon said latching clock signal and said system reset signal.

* * * * *